United States Patent
Bai (10) Patent No.: US 8,059,816 B2
(45) Date of Patent: Nov. 15, 2011

(54) SECRET SHARING TECHNIQUE WITH LOW OVERHEAD INFORMATION CONTENT

(75) Inventor: Li Bai, Newtown, PA (US)

(73) Assignee: Temple University of the Commonwealth System of Higher Education, Philadelphia, PA (US)

( * ) Notice: Subject to any disclaimer, the term of this patent is extended or adjusted under 35 U.S.C. 154(b) by 631 days.

(21) Appl. No.: 11/920,339

(22) PCT Filed: May 3, 2006

(86) PCT No.: PCT/US2006/016952
§ 371 (c)(1),
(2), (4) Date: Nov. 18, 2008

(87) PCT Pub. No.: WO2006/124289
PCT Pub. Date: Nov. 23, 2006

(65) Prior Publication Data
US 2010/0008505 A1    Jan. 14, 2010

Related U.S. Application Data (60) Provisional application No. 60/680,611, filed on May 13, 2005.

(51) Int. Cl.
H04L 9/00 (2006.01)
H04L 9/08 (2006.01)
H04L 9/32 (2006.01)
H04L 29/06 (2006.01)
H04L 9/14 (2006.01)

(52) U.S. Cl. ........ 380/255; 380/259; 380/277; 380/278; 380/279; 380/282; 713/150; 713/171

(58) Field of Classification Search ............... 380/255, 380/259, 277, 278, 279, 282; 713/150, 171
See application file for complete search history.

(56) References Cited

U.S. PATENT DOCUMENTS

| | | | | |
|---|---|---|---|---|
| 5,263,085 A | * | 11/1993 | Shamir | 380/30 |
| 5,583,939 A | * | 12/1996 | Chang et al. | 713/171 |
| 5,708,714 A | * | 1/1998 | Lopez et al. | 713/180 |
| 5,764,767 A | * | 6/1998 | Beimel et al. | 713/180 |
| 5,835,592 A | * | 11/1998 | Chang et al. | 380/285 |
| 5,966,444 A | * | 10/1999 | Yuan et al. | 380/283 |

(Continued)

FOREIGN PATENT DOCUMENTS

EP    0576224 A2 *  12/1993

(Continued)

OTHER PUBLICATIONS

Harn, L.; "Group-oriented (t, n) threshold digital signature scheme and digital multisignature", IEE Proc.-Comput. Digit. Tech., vol. 141, No. 5, Sep. 1994, pp. 307-313.*

(Continued)

*Primary Examiner* — Carl Colin
*Assistant Examiner* — Victor Lesniewski
(74) *Attorney, Agent, or Firm* — RatnerPrestia (57) ABSTRACT

An apparatus and method for sharing a secret comprising the steps of generating a first random matrix, generating a first projection matrix from the first random matrix, and determining a first remainder matrix from the first projection matrix and the first secret matrix. The first secret matrix may be determined using the remainder matrix and a plurality of distributed vector shares.

6 Claims, 2 Drawing Sheets

U.S. PATENT DOCUMENTS

| | | | |
|---|---|---|---|
| 6,088,454 A * | 7/2000 | Nagashima et al. | 380/286 |
| 6,182,214 B1 * | 1/2001 | Hardjono | 713/163 |
| 6,477,254 B1 * | 11/2002 | Miyazaki et al. | 380/286 |
| 6,788,788 B1 * | 9/2004 | Kasahara et al. | 380/277 |
| 6,810,122 B1 * | 10/2004 | Miyazaki et al. | 380/30 |
| 6,901,145 B1 * | 5/2005 | Bohannon et al. | 380/44 |
| 6,975,760 B2 * | 12/2005 | Suga | 382/171 |
| 6,996,724 B2 * | 2/2006 | Murakami et al. | 713/193 |
| 7,065,210 B1 * | 6/2006 | Tsujii et al. | 380/44 |
| 7,080,255 B1 * | 7/2006 | Kasahara et al. | 713/182 |
| 7,136,489 B1 * | 11/2006 | Madhusudhana et al. | 380/277 |
| 7,158,636 B2 * | 1/2007 | Ding | 380/30 |
| 7,167,565 B2 * | 1/2007 | Rajasekaran | 380/282 |
| 7,184,551 B2 * | 2/2007 | Slavin | 380/44 |
| 7,346,162 B2 * | 3/2008 | Slavin | 380/30 |
| 7,421,080 B2 * | 9/2008 | Matsumura et al. | 380/277 |
| 7,472,105 B2 * | 12/2008 | Staddon et al. | 1/1 |
| 7,551,740 B2 * | 6/2009 | Lee et al. | 380/278 |
| 7,590,236 B1 * | 9/2009 | Boneh et al. | 380/30 |
| 7,609,839 B2 * | 10/2009 | Watanabe et al. | 380/278 |
| 7,634,091 B2 * | 12/2009 | Zhou et al. | 380/277 |
| 7,653,197 B2 * | 1/2010 | Van Dijk | 380/44 |
| 7,787,619 B2 * | 8/2010 | Nadooshan et al. | 380/28 |
| 7,971,064 B2 * | 6/2011 | Yi et al. | 713/180 |
| 2003/0026432 A1 * | 2/2003 | Woodward | 380/278 |
| 2003/0210781 A1 * | 11/2003 | Mihaljevic et al. | 380/28 |
| 2003/0215089 A1 * | 11/2003 | Mihaljevic et al. | 380/42 |
| 2003/0221131 A1 * | 11/2003 | Mori et al. | 713/202 |
| 2004/0047472 A1 * | 3/2004 | Eskicioglu | 380/277 |
| 2004/0174995 A1 * | 9/2004 | Singh | 380/30 |
| 2004/0228485 A1 * | 11/2004 | Abu et al. | 380/44 |
| 2006/0002562 A1 * | 1/2006 | Berenstein et al. | 380/278 |
| 2006/0023887 A1 * | 2/2006 | Agrawal et al. | 380/277 |
| 2008/0181413 A1 * | 7/2008 | Yi et al. | 380/279 |

FOREIGN PATENT DOCUMENTS

WO      WO 0004422 A2 *    1/2000

OTHER PUBLICATIONS

Lin, T.-Y.; Wu, T.-C., "(t, n) threshold verifiable multisecret sharing scheme based on factorisation intractability and discrete logarithm modulo a composite problems", IEE Proc.-Comput. Digit. Tech., vol. 146, No. 5, Sep. 1999, pp. 264-268.*

Yi Xun; Tan, Chik How; Siew, Chee Kheong; Syed, Mahbubur Rahman; "ID-Based Key Agreement for Multimedia Encryption", IEEE Transactions on Consumer Electronics, vol. 48, No. 2, May 2002, pp. 298-303.*

Iwamoto, Mitsugu; Yamamoto, Hirosuke; "Visual Secret Sharing Schemes for Plural Secret Images", ISIT 2003, IEEE, p. 283.*

Stinson, Doug; "Visual cryptography and threshold schemes", IEEE Potentials, Feb./Mar. 1999, pp. 13-16.*

Shamir, "How to Share a Secret", Communications of the ACM, vol. 22, No. 11, Nov. 1979, pp. 612-613.

* cited by examiner

Figure 1 Image Secret Sharing of US Air Force

Figure 2 Image Secret Sharing of US Air Force (Corrupted)

US 8,059,816 B2

SECRET SHARING TECHNIQUE WITH LOW OVERHEAD INFORMATION CONTENT

CROSS REFERENCE TO RELATED APPLICATION

This application is a national phase of PCT Application No. PCT/US2006/016952, filed May 3, 2006 which claims priority to U.S. Provisional Application No. 60/680,611, filed May 13, 2005. The contents of which are herein incorporated by reference.

FIELD OF THE INVENTION

This present invention relates to systems and methods for cryptography, and in particular, to systems and methods for implementing a secret sharing scheme for secure mass medium storage.

BACKGROUND OF THE INVENTION

In today's world, information and audio-visual content is transmitted over various mediums by a multitude of content providers. The mediums include standard over-the-air broadcasts systems, cable broadcast systems, satellite broadcast systems, and the Internet. Moreover, the sensitive financial information demands for secure and reliable storages and transmission.

Cryptography systems permit the protection of information and content which is sensitive, or intended only for a select audience. For example, a provider of satellite radio broadcasts may encrypt its transmission so that only authorized receivers may play the transmitted content.

One existing cryptography system which utilizes a technique known as 'secret sharing' is referenced as 'threshold cryptography.' A (k, n) threshold secret sharing scheme is one type of secret sharing system. A 'secret sharing' technique, developed by Adi Shamir, discusses the (k, n) threshold secret sharing technique using a polynomial function of the $(k-1)^{th}$ power to construct 'n' shares from a shared secret value. The technique satisfies following the two information entropy requirements: i) any 'k' or more shares can be used to reconstruct the secret, and ii) any k−1 or less shares could not reveal any information about the secret (See, E. D. Kamin, J. W. Greene, and M. E. Hellman, "On secret sharing systems," IEEE Trans. Inform. Theory, vol. IT-29, no. 1, pp. 35-41, January 1983; A. Shamir, "How to share a secret," Communications of the ACM, Vo. 22, No. 11, pp. 612-613, November 1979). Threshold cryptography uses the secret sharing technique to divide an encryption key into 'n' shares, such that any 'k' shares can be used to reconstruct the key.

Van Dijk et al. and Jackson et. al. have proposed extending the 'secret sharing' concept to share multiple secret(s) by using linear coding (See M. Van Dijk, "A linear construction of perfect secret sharing schemes", in Advances in Cryptology—(EUROCRYPT '94): Workshop on the Theory and Application of Cryptographic Techniques Advances in Cryptology, A. De Santis, Ed., IACR. Perugia, Italy: Springer-Verlag, May 1994, pp. 23-35; W. A. Jackson and K. M. Martin, "Geometric secret sharing schemes and their duals", Designs, Codes and Cryptography, vol. 4, no. 1, pp. 83-95, January 1994).

However, existing methods and systems for sharing multiple secrets suffer from large information overhead requirements.

Thus, there is presently a need for a system and method for sharing multiple secrets which has low information overhead, but yet maintains a high level of security.

SUMMARY OF THE INVENTION

An exemplary embodiment of the present invention comprises a method for sharing a secret including the steps of generating at least one first random matrix, generating at least one first projection matrix from the at least one first random matrix, and determining at least one first remainder matrix from the at least one first projection matrix and at least one first secret matrix.

Another exemplary embodiment of the present invention comprises a conditional access system including a transmitter for transmitting at least one encrypted signal, and a receiver for receiving the at least one encrypted signal, and including K vector shares, wherein the receiver can utilize the K vector shares to decrypt the at least one encrypted signal.

Another exemplary embodiment of the present invention comprises a computer system including at least one server computer and, at least one user computer coupled to the at least one server through a network, wherein the at least one server computer includes at least one program stored therein, said program performing the steps of generating at least one first random matrix, generating at least one first projection matrix from the at least one first random matrix, and determining at least one first remainder matrix from the at least one first projection matrix and at least one first secret matrix.

Another exemplary embodiment of the present invention comprises a computer readable medium having embodied thereon a computer program for processing by a machine, the computer program including a first code segment for generating at least one first random matrix, a second code segment for generating at least one first projection matrix from the at least one first random matrix, and a third code segment for determining at least one first remainder matrix from the at least one first projection matrix and at least one first secret matrix.

Another exemplary embodiment of the present invention comprises a computer data signal embodied in a carrier including a first code segment for generating at least one first random matrix, a second code segment for generating at least one first projection matrix from the at least one first random matrix, and a third code segment for determining at least one first remainder matrix from the at least one first projection matrix and at least one first secret matrix.

DETAILED DESCRIPTION

The present invention comprises, in one exemplary embodiment, a system and method for sharing multiple secrets which utilizes a matrix projection technique. The present method satisfies information entropy properties to protect the secret values, but it has the additional advantage of reducing the information overhead required to store and transmit secret shares.

The present system and method may also be extended to image secret sharing applications due to the low overhead requirement for information content. The image secret sharing system and method can also provide the benefits of: 1) smaller size for image shares as compared to the size of the secret image, 2) nearly lossless reconstruction of the secret image, and 3) image secret sharing for all image types (e.g., black and white images, gray images and colored, images).

As noted above, Shamir developed the idea of a (k, n) threshold secret sharing technique. (See, A. Shamir, "How to share a secret", Communications of the ACM, vol. 22, no. 11, pp. 612-613, November 1979. and G. Blakley, "Safeguarding cryptographic keys", presented at the Proceedings of the AFIPS 1979 National Computer Conference, vol. 48, Arlington, Va., June 1997, pp. 313-317). The general idea behind 'secret sharing' is to distribute a secret (e.g., encryption/ decryption key) to 'n' different participants so that any 'k' participants can reconstruct the secret, and so that any k−1 or fewer participants can not reveal anything about the secret. These requirements are also the basis for 'perfect' secret sharing in terms of information entropy (See, E. D. Kamin, J. W. Greene, and M. E. Hellman, "On secret sharing systems", IEEE Trans. Inform. Theory, vol. IT-29, no. 1, pp. 35-41, January 1983).

The 'secret sharing' concept was further extended as a generalized secret sharing technique by Ito et. al. (See, M. Ito, A. Saito, and T. Nishizeki, "Secret sharing scheme realizing general access structure", in Proc. IEEE Global Telecommunications Conference (Globecom '87), Tokyo, Japan, January 1987, pp. 99-102.). The secret, K is distributed among a set of 'n' participants $\mathcal{P} = \{P_1\ P_2 \ldots P_n\}$ so that only the qualified subsets of $\mathcal{P}$ can reconstruct the secret(s). These qualified subsets, denoted as rare called the "access structure" of the secret sharing scheme. In a perfect secret sharing scheme, any subset of participants that is not in $\Gamma$ cannot obtain any information about the secret(s). The number of participants in each subset of $\Gamma$ is not necessarily the same. For example, in a set of 4 participants $\mathcal{P} = \{P_1, P_2, P_3, P_4\}$, a generalized secret sharing scheme may have an access structure $\Gamma = \{\{P_1, P_2\}, \{P_2, P_3, P_4\}\}$. Here, the first subset has two participants while the second subset can have three participants. For a (3, 4) threshold secret sharing scheme, the access structure $\Gamma = \{\{P_1, P_2, P_3,\}, \{P_1, P_3, P_4\}, \{P_2, P_3, P_4\}, \{P_1, P_2, P_4\})\}$. In each qualified subset, the number of participants is 3. The (k, n) threshold secret sharing scheme is a specialized generalized secret sharing technique.

The perfect secret sharing scheme is defined using information entropy as, 1) any qualified subset, Y can construct the secret(s), K:

$\forall_{y \in \Gamma} H(K|Y) = 0$, and 2) any unqualified subset, Y has no information about the secret(s), K:

$\forall_{y \notin \Gamma} H(K|Y) = H(K)$.

Benaloh et al. proposed a generalized perfect secret sharing technique based upon a monotone circuit design (See, G. Blakley, "Safeguarding cryptographic keys", presented at the Proceedings of the AFIPS 1979 National Computer Conference, vol. 48, Arlington, Va., June 1997, pp. 313-317.). Brickell extended secret sharing schemes further (See, E. F. Brickell, "Some ideal secret sharing schemes", in Advances in Cryptology—(EUROCRYPT '89): Workshop on the Theory and Application of Cryptographic Techniques Advances in Cryptology, J.-J. Quisquater and J. Vandewalle, Eds., IACR. Houthalen, Belgium). He showed necessary but not sufficient conditions to construct multiple-secret sharing schemes, and also introduced compartment secret sharing. Compartment secret sharing allows multiple groups to collaborate together with different thresholds to obtain the secret. Jackson et al. described a multiple-secret sharing scheme using a geometrical approach (See, [JAC94]). Van Dijk established a connection between multiple-secrets sharing and linear codes in vector space construction (See, M. Van Dijk, "A linear construction of perfect secret sharing schemes", in Advances in Cryptology—(EUROCRYPT '94): Workshop on the Theory and Application of Cryptographic Techniques Advances in Cryptology, A. De Santis, Ed., IACR. Perugia, Italy: Springer-Verlag, May 1994, pp. 23-35). These multiple-secret sharing techniques are often categorized as Linear Secret Sharing Schemes (LSSS).

There are at least two approaches to measure efficiency of secret sharing schemes (See, H. M. Sun and S. P. Shieh, "Constructing perfect secret sharing schemes for general and uniform access structures", Journal of Information Science and Engineering, vol. 15, pp. 679-689, October 1999). These two approaches are: i) the Information Rate, and ii) the Dealer's Randomness Coefficient (See, C. Blundo, A. De Santis, A. G. Gaggia, and U. Vaccaro, "New bounds on the information rate of secret sharing schemes", IEEE Trans. Inform. Theory, vol. 41, no. 2, pp. 549-554, March 1995; F. Brickell and D. M. Davenport, "On the classification of ideal secret sharing schemes", in Advances in Cryptology—(CRYPT '89), G. Brassard, Ed., IACR. Springer-Verlag, 1989, pp. 278-285; C. Blundo, A. G. Gaggia, and D. R. Stinson, "On the dealer's randomness required in secret sharing schemes", in Advances in Cryptology—(EUROCRYPT '94): Workshop on the Theory and Application of Cryptographic Techniques Advances in Cryptology, A. De Santis, Ed., IACR. Perugia, Italy: Springer-Verlag, May 1994, pp. 35-46; A. De Santis and B. Masucci, "Multiple ramp schemes", IEEE Trans. Informs. Theory, vol. 45, no. 5, pp. 1720-1728, July 1999).

The Information Rate, $\rho$, is the rate between the length (in bits) of the secret(s) and the maximum length of the shares of the participants:

$$\rho(\Sigma, \Gamma, K) = \frac{\log_2 |K|}{\max_{p_i \in P}(\log_2 |S(p_i)|)},$$

where K is the set of all possible secrets for a secret sharing scheme, and S(Pi) is the set of all possible shares for the $i^{th}$ participant $p_i \in \mathcal{P}$.

The size of the shares given to the participants is an important measure in the design of a secret sharing scheme. If the shares are too large, the memory requirements used to compute the secret will become inefficient. Therefore, an ideal secret sharing is defined as a perfect secret sharing with Information Rate $\rho$ $(\Sigma, \Gamma, K) = 1$ (See, E. F. Brickell and D. M. Davenport, "On the classification of ideal secret sharing schemes", in Advances in Cryptology—(CRYPT '89), G. Brassard, Ed., IACR. Springer-Verlag, 1989, pp. 278-285).

The second measure is the Dealer's Randomness Coefficient, $\mu$. It represents the amount of randomness per bit of the secret(s) required by dealer to set up the scheme (See, [BLU94]), and may be expressed as:

$$\mu(\Sigma, \Gamma, \Pi_K) = \frac{H(p_1, p_2, \ldots p_n | K)}{H(K)},$$

where $\Pi_K$ is the probability distribution on the secrets K. The dealer often is interested in the minimum possible amount of randomness to set up a secret sharing scheme $\Sigma$ for a given access structure $\Gamma$. The drawback of perfect secret sharing schemes is the overhead because they cannot allow the size of secret shares to become smaller than the size of the secret. There is another type of schemes permit an unqualified group to obtain partial information on the secret(s), but not sufficiently to solve the secret(s). The schemes allow the size of the secret shares to be smaller than the size of the secret. When exposed information is proportional to the size of unqualified group, these types of secret sharing schemes are regarded as ramp secret sharing schemes (see, A. De Santis and B. Masucci, "Multiple ramp schemes," *IEEE Trans. Inform. Theory*, vol. 45, no. 5, pp. 1720-1728, July 1999; H. Yamamoto, "On secret sharing systems using (k, l, n) threshold scheme," *Electronics and Communications in Japan, Part I*, vol. 69, no. 9, pp. 46-54, 1986.). This invention is classified as a strong ramp secret sharing scheme which reduces the size of the shares while maintains strong security measures.

The multiple-secret sharing technique has been used in image secret sharing by Naor and Shamir (See, M. Naor and A. Shamir, "Visual cryptography", presented at the Proceedings of the Conference on Advances in Cryptology—Eurocrypt '94, A. De Santis, Ed., Berlin, Germany, 1994, pp. 1-12). Although the technical detail is quite different than multiple secret(s) sharing discussed above, the image secret sharing method proposed the simple idea to stack any k image shares to show the original image. It has been also referred as visual cryptography or visual secret sharing because the method does not involve much cryptographic computation, rather just binary or operations.

This image secret sharing method was introduced as a (2, 2) threshold image secret sharing technique for a black and white image. Ateniese et al. developed a (k, n) threshold image secret sharing technique (See, G. Ateniese, C. Blundo, A. De Santis, and D. R. Stinson, "Visual cryptography for general access structures", Information and Computation, vol. 129, no. 2, pp. 86-106, 1996). However, there are several obstacles for the (k, n) threshold image secret sharing technique. Various researchers devoted significant amounts of efforts on these challenges, which include: i) colored image extension, and ii) optimal image contrast rate (See, R. Lukac and K. N. Plataniotis, "Colour image secret sharing", Electronics Letters, vol. 40, no. 9, pp. 529-531, April 2004, M. Naor and A. Shair. (1996, June) Visual cryptography II: Improving the contrast via the cover base. C. N. Yang, "A note on efficient color visual encryption", Journal of Information Science and Engineering, vol. 18, pp. 367-372, 2002; C. Blundo, A. De Santis, and D. R. Stinson, "On the contrast in visual cryptography schemes", Journal of Cryptology, vol. 12, pp. 261-289, 1999, C. Kuhlmann and H. U. Simon, "Construction of visual secret sharing schemes with almost optimal contrast", presented at the Proceedings of the eleventh annual ACM-SIAM symposium on discrete algorithms, D. Shmoys, Ed., San Francisco, Calif., United States, January 2000, pp. 263-272., M. Naor and A. Shair. (1996, June) Visual cryptography II: Improving the contrast via the cover base.

An exemplary embodiment of the present invention deals with a matrix projection technique for secret sharing according to the (k, n) method, and its application in data secret sharing and image secret sharing. The shares 'n' are distributed as vectors (as opposed to values with a specified bit length), such that any 'k' vectors chosen from these shares have the same projection matrix. Since the secrets are represented in a matrix, it can potentially reduce the size of secret shares. When the matrix projection secret sharing technique is applied to image sharing, the size of image shares becomes much smaller than the size of the original image. Moreover, the transmission bandwidth required to transmit these shares is much smaller compared to the above-described image secret sharing methods.

Next, it will briefly be described how a matrix projection is defined. Additionally, it will be shown that a matrix projection is invariant under a similarity transformation, and possesses certain unique properties.

Matrix Projection

First, a matrix projection must be defined through a simple example. For example, let matrix A be an m×k matrix of rank k (k≤m), and projection matrix of A be denoted as $\mathcal{H}_A$. The projection matrix $\mathcal{H}_A$ is defined as:

$$\mathcal{H}_A = A(A'A)^{-1}A',$$

where $(\cdot)'$ is the transpose of a matrix. We can also write $\mathcal{H}_A = \text{proj}(A)$.

For example, consider a 3×2 matrix A as follows:

$$A = \begin{bmatrix} 10 & 1 \\ 7 & 2 \\ 8 & 4 \end{bmatrix},$$

we can calculate $\mathcal{H}_A$ as a 3×3 matrix using the definition as:

$$\mathcal{H}_A = \begin{bmatrix} 0.8923 & 0.2872 & -0.1167 \\ 0.2872 & 0.2341 & 0.3111 \\ -0.1167 & 0.3111 & 0.8736 \end{bmatrix}.$$

It will be noted that the above matrix projection ($\mathcal{H}_A$) is invariant under similarity transformation.

If B is a similarity transformation matrix of A, such that B=AX where X is a k×k nonsingular matrix, we can show that $\mathcal{H}_B = \mathcal{H}_A$ [Lemma 2.1].

Proof:

$$\mathcal{H}_B = B(B'B)^{-1}B' = AX((AX)'AX)^{-1}(AX)' = AXX^{-1}(A'A)^{-1}(X')^{-1}X'A'.$$

Since X is a k×k nonsingular matrix, $XX^{-1}$ and $(X')^{-1}X'$ are identity matrices. $\mathcal{H}_B$ can be simplified further as:

$$\mathcal{H}_B = A(A'A)^{-1}A' = \mathcal{H}_A$$

Take an example for a matrix X as a 2×2 matrix such that:

$$X = \begin{bmatrix} 1 & 3 \\ 1 & 2 \end{bmatrix},$$

We can calculate matrix B as:

$$B = AX = \begin{bmatrix} 11 & 32 \\ 9 & 25 \\ 12 & 32 \end{bmatrix}.$$

One can verify that:

$$\mathcal{H}_B = \begin{bmatrix} 0.8923 & 0.2872 & -0.1167 \\ 0.2872 & 0.2341 & 0.3111 \\ -0.1167 & 0.3111 & 0.8736 \end{bmatrix} = \mathcal{H}_A.$$

If there are any k linearly independent vectors $x_i$s with dimension of k, we can compute the set of vectors $v_i$ as:

$$v_i = Ax_i,$$

where $1 \leq i \leq k$. These k vectors $v_i$ can construct a matrix B as:

$$B=[v_1\ v_2\ \ldots\ v_k].$$

We can show $\mathcal{H}_B = \mathcal{H}_A$.

Thus, we can choose an m×k dimensional matrix A of rank k ($k \leq m$), and a set of k linearly independent vectors $x_i$ where $1 \leq i \leq k$ [Theorem 2.1]. We can construct a matrix B using k vectors $v_i$ where $v_i = A\ x_i$ as $B=[v_1\ v_2\ \ldots\ v_k]$. The projection matrices satisfy:

$$\mathcal{H}_A = \mathcal{H}_B.$$

Proof: Since $B=[v_1\ v_2\ \ldots\ v_k]$ and $v_i = A\ x_i$, $$B = [v_1\ v_2\ \ldots\ v_k]$$
$$= [Ax_1\ Ax_2\ \ldots\ Ax_k]$$
$$= A[x_1\ x_2\ \ldots\ x_k]$$

Let $X=[x_1\ x_2\ \ldots\ x_k]$ where X is a full rank k×k matrix because X has k linearly independent vectors $x_i$s. We can write $B=AX$. From the Lemma 2.1 result, we have $$\mathcal{H}_A = \mathcal{H}_B.$$

The projection matrix $\mathcal{H}_A$ is invariant under similarity transformation from matrix A to another matrix B. There are also some important properties that a projection matrix $\mathcal{H}_A$ possesses. They are:

1) $\mathcal{H}_A$ is symmetric,
2) $\mathcal{H}_A \times A = A$,
3) $\mathcal{H}_A$ is idempotent, i.e. $\mathcal{H}_A^2 = \mathcal{H}_A$, and
4) tr $(\mathcal{H}_A)$=rank$(\mathcal{H}_A)$=k, where tr$(\mathcal{H}_A)$ is the trace for matrix $\mathcal{H}_A = (h_{ij})$ that $$tr(\mathcal{H}_A) = \sum_{i=1}^{k} h_{ii}.$$

Properties (1)-(3) above can be easily shown through matrix manipulation. Property (4) is an important property for an idempotent matrix; it is useful and simple to validate whether the obtained projection matrix is correct.

An idempotent matrix D can only have Zeros (0s) and Ones (1s) as the Eigenvalues [Lemma 2.2].
Proof: For an idempotent matrix D and its Eigenvalues are $\lambda$s, we have:

$$Dx = \lambda x \Rightarrow D^2 x = D\lambda x$$

Since D is an idempotent matrix that $D^2 = D$, it can show that $Dx = \lambda Dx$ or, we can simplify it as $\lambda x = \lambda\lambda x$. In other words, we have $(\lambda^2 - \lambda)x = 0$. This condition has to be hold for nonzero x which implies that:

$$\lambda^2 - \lambda = 0,\text{ or } \lambda = 0, 1.$$

For an idempotent matrix D, tr $(D)$=rank $(D)$.[Lemma 2.3]
Proof. The idempotent matrix H has a diagonal similarity matrix $\Lambda$ such that:

$$D = T\Lambda T^{-1},$$

where T is Eigenvector matrix and $\Lambda$ is the Eigenvalue matrix. Since D and $\Lambda$ are similarity matrices, we know that:

$$\text{rank}(D) = \text{rank}(\Lambda),$$

and $$tr(D) = tr(\Lambda).$$

Also stated in Lemma 2, the idempotent matrix D has Eigenvalues as 0s or 1s. A must have Eigenvalues of 0s and 1s on its diagonal:

$$tr(\Lambda) = \text{rank}(\Lambda).$$

Therefore, $$tr(D) = \text{rank}(D).$$

Let an m×k dimensional matrix A of rank k($k \leq m$), tr($\mathcal{H}_A$)=k where $\mathcal{H}_A$=proj (A) [Theorem 2.2].
Proof: Since rank(A)=k, we have that rank(A'A)=k and rank$((A'A)^{-1})$=k.
If $M=(A'A)^{-1}$, we can find rank (A×M) as:

$$\text{rank}(A)+\text{rank}(M)-\min(m,k) \leq \text{rank}(A \times M) - \min(\text{rank}(A), \text{rank}(M)).$$

Clearly, it is simplified as:

$$k+k-k \leq \text{rank}(A \times M) \leq \min(k;k),\text{ or rank}(A \times M)=k.$$

Now, $\mathcal{H}_A$=proj(A)=A×M×A':

$$\text{rank}(A \times M) + \text{rank}(A') - \min(m;k) \leq \text{rank}(A \times M \times A') \leq \min(\text{rank}(A \times M), \text{rank}(A'))$$

$$k+k-k \leq \text{rank}(A \times M \times A') \leq \min(k,k),$$
$$\text{or } k \leq \text{rank}(\mathcal{H}_A) \leq k.$$

It shows that rank($\mathcal{H}_A$)=k. Since $\mathcal{H}_A$ is an idempotent matrix and tr($\mathcal{H}_A$)=rank($\mathcal{H}_A$), we have proved that:

$$tr(\mathcal{H}_A)=k$$

Next secret sharing using matrix projection will be discussed. The idea is to use matrix projection invariance properties under similarity transform. First, Shamir's polynomial secret sharing technique will be discussed.

Matrix Projection Secret Sharing

As discussed above, Shamir demonstrated a (k, n) threshold secret sharing technique for $k \leq n$ using the $(k-1)^{th}$ polynomial function (See, A. Shamir, "How to share a secret", Communications of the ACM, vol. 22, no. 11, pp. 612-613, November 1979). To share a secret value $d_0 \in Z$, a $(k-1)^{th}$ polynomial function f(x) can be written using some random coefficients $d_i \in Z$ for $1 \leq i \leq k-1$ as:

$$f(x)=d_0+d_1 x+\ldots+d_{k-1}x^{k-1} \bmod p,$$

where $p \in Z$ is a prime modulus number. To distribute 'n' shares to 'n' different participants, a distribution center can calculate 'n' pairs of values $(x_i, y_i)$ where $y_i = f(x_i)$ for 'n' distinct values where $x_i \in Z_p$. The variable $d_0$ may be determined with any k shares using Lagrange formulation as:

$$d_0 = \sum_{i=1}^{k} y_i \prod_{j=1}^{k} \frac{-x_j}{x_i - x_j} \bmod p.$$

For example, consider a secret value $d_0=5$ and we want to have (2, 4) secret sharing for p=19. The polynomial function f(x) can be written as:

$$f(x)=5+3x \bmod 19,$$

where $d_1$ is chosen as 3.

If we randomly pick some values for $x_1=3$, $x_2=5$, $x_3=7$, $x_4=10$, we can calculate these four shares as (3, 14), (5, 1), (7, 7), (10, 16). For any k−1 shares or less, there is no knowledge about the secret value $d_0$. For any k shares or more, one can determine the value of $d_0$ using the Lagrange formulation as stated above. The size of the secret is same as the size of the share.

Modular arithmetic is important for cryptography, and it is equally important for the secret sharing techniques. To use matrix projection in secret sharing, we have to first derive some matrix modular arithmetic.

In modular arithmetic, an integer r can have an inverse, $r^{-1}$ such that $r \times r^{-1} \pmod{p} = 1$. If p is a prime number, Fermat's theorem states that $r^{-1} \pmod{p} \equiv r^{p-2} \pmod{p}$. For example, $$4^{-1} \pmod{19} = 4^{19-2} \pmod{19} = 5 \pmod{19}.$$

Euclid's algorithm can also be used to compute $r^{-1} \pmod{p}$ if p is not a prime number, but r and p must be co-prime to each other or $\gcd(r, p) = 1$ (See, [SEB89]).

We are interested in how to compute matrix inverse in modular operation because there is a matrix inverse operation in matrix projection formula (as discussed above). Hill substitution ciphers also used the modular matrix inversion to compute the decryption key matrix (See, D. R. Stinson, *Cryptography: Theory and Practice,* 2nd edition. Chapman & Hall/CRC, 2002, ch. 1.2.4, pp. 34-36). Fortunately, the modular arithmetic for matrix operation can be also extended as the same as the mathematic operation in the matrix theory.

The square matrix M has an inverse $M^{-1}$ if $\det(M) \neq 0$. In modular computation, a square matrix can also have a modular inverse, $M^{-1} \pmod{p}$ if $\mod(\det(M), p) \neq 0$. The remainder of the discussion with regard to the present invention will be restricted following two conditions:

1) p is a prime number, and
2) $\mod(\det(M), p) \neq 0$.

$M^{-1} \pmod{p}$ can be computed as:

$$M^{-1} \pmod{p} = [(\det(M))^{-1} \pmod{p} \times \mathrm{adj}(M)] \pmod{p},$$

where $\mathrm{adj}(M)$ is adjoint matrix for M.
Let p=19 and a 2×2 matrix M that:

$$M = \begin{bmatrix} 2 & 5 \\ 9 & 8 \end{bmatrix}.$$

We can calculate that $\det(M) = -29$, or $\det(M) \pmod{19} = 9$. It can be found that $9^{-1} \pmod{19} = 17$ and $\mathrm{adj}(M)$ as:

$$\mathrm{adj}(M) = \begin{bmatrix} 8 & -5 \\ -9 & 2 \end{bmatrix}.$$

Therefore, $$M^{-1} \pmod{19} = \left( 17 \times \begin{bmatrix} 8 & -5 \\ -9 & 2 \end{bmatrix} \right) \pmod{19} = \begin{bmatrix} 3 & 10 \\ 18 & 15 \end{bmatrix}.$$

As shown in Theorem 2.1 above, we require that these k vectors $x_i$s for $1 \leq i \leq k$ are linearly independent so that the projection matrix is invariant under similarity transformation. In the (k, n) matrix secret sharing technique according to the present invention, this requirement becomes very important to determine whether a modular matrix inverse exists. Migler et. al. showed that there were many linearly independent random matrices or vectors in the finite field with a fixed rank (see T. Migler, K. E. Morrison, and M. Ogle. "Weight and rank of matrices over finite fields", Sep. 29, 2003, Specifically, the number of random m×k matrices of rank k (availability of matrix A) is $(p^m-1)(p^m-p) \ldots (p^m-p^{k-1})$, and the number of k linearly independent random vector of dimension k×1 is $(p^k-1)(p^k-p^{k-1}) \ldots (p^k-p^{k-1})$ (availability of vector $x_i$s, or possible number of participants allowed). It suggests that we can construct many modular matrices with inverse.

Since we cannot use (k−1) shares to solve any secrets in $\mathscr{H}_A$, we have to restrict another condition to satisfy this requirement. Consider that we know (k−1) vectors $v_i$s, we also have $\mathscr{H}_A v_i = A(A'A)^{-1}A'A x_i = v_i$, and $\mathrm{tr}(\mathscr{H}_A) = k$ and matrix $\mathscr{H}_A$ is symmetric. It is clear that one can set up (k−1)m simultaneous equations to solve m(m+1)/2−1 values in matrix $\mathscr{H}_A$. To prevent it, we need ensure (k−1)m<m(m+1)/2−1. Therefore, another requirement in present secret sharing scheme is m>2(k−1)−1.

Next, secret sharing using matrix projection according to an exemplary embodiment of the present invention will be described. The secret(s) are stored into a square matrix $\mathscr{D}$ with dimension of m×1. The secret sharing scheme according to an exemplary embodiment of the present invention will be explained with respect to: i) share construction and ii) secret reconstruction.

To secretly share a matrix $\mathscr{D}$, we must first choose a prime number 'p.' The value of this prime number directly determines the secrecy of the system. In particular, since the prime number is used in a modulus (mod) computation (as discussed below), the larger the prime number, the more difficult the secret matrix ($\mathscr{D}$) is to determine. Our (k, n) matrix projection sharing scheme is described as in following steps:

1) Construct an m×k matrix A of rank k (m>2(k−1)−1),
2) Compute $\mathscr{H}_A = A(A'A)^{-1}A' \pmod{p}$,
3) Randomly choose n distinct values for $a_i$ and construct n vectors $x_i$ as:

$$x_i = [1 \; a_i \ldots a_i^{k-1}]' \pmod{p},$$

4) Calculate the $i^{th}$ participants share $v_i$ as $v_i = A x_i \pmod{p}$ for $1 \leq i \leq n$,
5) Determine the remainder matrix $\mathscr{D}_0 = (\mathscr{D} - \mathscr{H}_A) \pmod{p}$, and make it public,
6) Destroy matrix A, $\mathscr{H}_A$, $\mathscr{D}$, and n vectors $x_i$s,
7) Distribute these n shares $v_i$ to n different participants in $\mathscr{P}$.

For k−1 or less shares, the projection matrix ($\mathscr{H}_A$) could not be computed due to lack of full dimensionality. Therefore, the secret matrix $\mathscr{D}$ could not be found. If there are k or more vector shares $v_i$, we can determine the secret matrix $\mathscr{D}$ as follows.

Let these vector shares be $v_1, v_2, \ldots, v_k$, the secret matrix $\mathscr{D}$ will be determined as follows:

1) Construct a matrix B as $B = [v_1 \; v_2 \ldots v_k]$, where the order of $v_i$ is not important.
2) Compute $\mathscr{H}_B = B(B'B)^{-1} B' \pmod{p}$ and verify $\mathrm{tr}(\mathscr{H}_B) = k$, and
3) since we know that $\mathscr{H}_B = \mathscr{H}_A$, it can easily find the secret matrix $\mathscr{D}$ is, $$\mathscr{D} = (\mathscr{D}_0 + \mathscr{H}_B) \pmod{p}.$$

For example, consider a simple (2, 4) matrix secret sharing scheme to demonstrate the technique. Let p=19 and the secret (3×3) matrix $\mathscr{D}$ as:

$$\mathscr{D} = \begin{bmatrix} 2 & 3 & 1 \\ 5 & 4 & 6 \\ 8 & 9 & 7 \end{bmatrix}.$$

To construct the secret shares, we pick a random (3×2) matrix A that, $$A = \begin{bmatrix} 10 & 1 \\ 7 & 2 \\ 8 & 4 \end{bmatrix}$$

We can compute $\mathcal{H}_A = A(A'A)^{-1}A' \pmod p$ as $$\mathcal{H}_A = A(A'A)^{-1}A' \pmod{19} = \begin{bmatrix} 13 & 6 & 13 \\ 6 & 4 & 16 \\ 13 & 16 & 4 \end{bmatrix}.$$

and choose four (4) values, such that $a_1=17$, $a_2=7$, $a_3=9$ and $a_4=10$. Then we can construct three four (4) vectors $x_i$s as:

$$x_1 = \begin{bmatrix} 1 \\ a_1 \end{bmatrix} = \begin{bmatrix} 1 \\ 17 \end{bmatrix},$$

$$x_2 = \begin{bmatrix} 1 \\ a_2 \end{bmatrix} = \begin{bmatrix} 1 \\ 7 \end{bmatrix},$$

$$x_3 = \begin{bmatrix} 1 \\ a_3 \end{bmatrix} = \begin{bmatrix} 1 \\ 9 \end{bmatrix}, \text{ and}$$

$$x_4 = \begin{bmatrix} 1 \\ a_4 \end{bmatrix} = \begin{bmatrix} 1 \\ 10 \end{bmatrix}.$$

Next we compute vector shares $v_i = A \times x_i \pmod{19}$ for $i=1, 2, 3$ and 4 as:

$$v_1 = \begin{bmatrix} 8 \\ 3 \\ 0 \end{bmatrix},$$

$$v_2 = \begin{bmatrix} 17 \\ 2 \\ 17 \end{bmatrix},$$

$$v_3 = \begin{bmatrix} 0 \\ 6 \\ 6 \end{bmatrix}, \text{ and}$$

$$v_4 = \begin{bmatrix} 1 \\ 8 \\ 10 \end{bmatrix}.$$

and calculate $\mathcal{D}_0$ as, $$\mathcal{D}_0 = (\mathcal{D} - \mathcal{H}_A) \pmod p = \begin{bmatrix} 8 & 16 & 7 \\ 18 & 0 & 9 \\ 14 & 12 & 3 \end{bmatrix}.$$

The remainder matrix $\mathcal{D}_0$ is made as public information. We can destroy A, $x_i$s, $\mathcal{H}_A$ and $\mathcal{D}$, then we distribute the four (4) vector shares $v_i$s to four (4) different participants. Any individual participant could not reveal the secret matrix $\mathcal{D}$ with knowledge of remainder matrix $\mathcal{D}_0$ and his or her own share.

To compute the secret matrix $\mathcal{D}$, any two (2) shares are needed, along with the remainder matrix $\mathcal{D}_0$. For example, let these two shares be $v_1$ and $v_4$, then we can construct a matrix B as, $$B = [v_1 \; v_4] = \begin{bmatrix} 8 & 1 \\ 3 & 8 \\ 0 & 10 \end{bmatrix}.$$

The projection matrix $\mathcal{H}_B = B(B'B)^{-1}B' \pmod p$ can be computed as, $$\mathcal{H}_B = B(B'B)^{-1}B' \pmod{19} = \begin{bmatrix} 13 & 6 & 13 \\ 6 & 4 & 16 \\ 13 & 16 & 4 \end{bmatrix},$$

and $\text{tr}(\mathcal{H}_B) \pmod{19} = 2$. The result is exactly the same value as k. The secret matrix $\mathcal{D}$ can be reconstructed using $\mathcal{H}_B$ and $\mathcal{D}_0$ as, $$\mathcal{D} = (\mathcal{D}_0 + \mathcal{H}_B) \pmod p = \left( \begin{bmatrix} 8 & 16 & 7 \\ 18 & 0 & 9 \\ 14 & 12 & 3 \end{bmatrix} + \begin{bmatrix} 13 & 6 & 13 \\ 6 & 4 & 16 \\ 13 & 16 & 4 \end{bmatrix} \right) \pmod{19}$$

$$= \begin{bmatrix} 2 & 3 & 1 \\ 5 & 4 & 6 \\ 8 & 9 & 7 \end{bmatrix}.$$

This result is the same as the original secret matrix $\mathcal{D}$. Accordingly, we have developed a secure secret sharing technique using matrix projection. The size of the secrets is larger than the size of each share. In terms of overhead cost, we can also compute for Shamir's method and our method using the examples for our (2, 4) schemes. In Shamir's method, there are 4 share values over 1 secret value. The overhead cost is:

$$\frac{4 \times 1}{1} = 4.$$

The possible number of participants in Shamir's scheme is $p-1$, or 18 participants for modulus of 19 in this case.

For our matrix projection secret sharing technique, there are four (4) vector shares v; with 3 elements in each share (vector), over nine (9) secret values (in the 3×3 secret matrix $\mathcal{D}$). If we also add the remainder matrix ($\mathcal{D}_0$) of nine (9) secret values, the overhead cost is:

$$\frac{4 \times 3 + 9}{9} = 2.333.$$

Clearly, the secret sharing technique of the present invention saves much overhead cost. In addition, the possible number of participants in our technique is $(p^k-1)(p^k-p) \ldots (p^k-p^{k-1})$ or 123,120 participants when k=2 for modulus of 19. We can see that this invention allows larger number of participants to share more secrets.

Next, we will extend the above-described exemplary secret sharing technique into some important applications such as image secret sharing. Image secret sharing has been described by Naor and Shamir, and was called visual secret sharing (See, M. Naor and A. Shamir, "Visual cryptography", presented at the Proceedings of the Conference on Advances in Cryptology—Eurocrypt '94, A. De Santis, Ed., Berlin, Germany, 1994, pp. 1-12, M. Naor and A. Shair. (1996, June) Visual cryptography II: Improving the contrast via the cover base. Image secret sharing is often used to protect a secret image from unauthorized access, but it also increases reliability to prevent image damage due to corrupted pixels for an unreliable transmission (such as unreliable satellite transmission).

Matrix Projection Image Secret Sharing

In a (k, n) image secret sharing scheme, an image is split into 'n' shares such that: i) any k or more image shares can be used to reconstruct the image, and ii) any k−1 or less image shares do not reveal any information about the secret image. The technique of Naor and Shamir was proposed for black and white images. Their first scheme is a (2, 2) that:

1) a white pixel will be represented as two pixels for each share—one black and one white so that superimposing these two shares will display one white pixel and one black pixel such as:

2) a black pixel will be represented as two pixels for each share—one black and one white so that superimposing these two shares will display two black pixels such as:

However, the reconstructed image loses its contrast in resolution and is sometimes distorted. In addition, the sizes of the shares are twice as larger as the original image. Overall, the storage for image shares is 4 times larger than the size of the secret image. Ateniese extended the technique as (k, n) image secret sharing (See, G. Ateniese, C. Blundo, A. De Santis, and D. R. Stinson, "Visual cryptography for general access structures", Information and Computation, vol. 129, no. 2, pp. 86-106, 1996). The challenge remains for various researchers to extend their technique for grey images and colored images, but the loss of contrast for the reconstructed image prevents the original image from being fully rebuilt (See, R. Lukac and K. N. Plataniotis, "Colour image secret sharing", Electronics Letters, vol. 40, no. 9, pp. 529-531, April 2004, M. Naor and A. Shair. (1996, June) Visual cryptography II: Improving the contrast via the cover base. C. N. Yang, "A note on efficient color visual encryption", Journal of Information Science and Engineering, vol. 18, pp. 367-372, 2002).

The present inventor describes an approach which involves splitting a colored image into 'n' shares using the matrix projection secret sharing technique described above. The idea is to think of an image of m×m pixels as a secret matrix $\mathcal{D}$. We can construct an m×k matrix A and its projection matrix $\mathcal{H}_A$. Each share is a vector $v_i = Ax_i \pmod{p}$ with dimension as m×1 or with m pixels for $1 \leq i \leq n$ and $x_i$s are k×1 vectors constructed from Vandermore matrix. In addition, the remainder matrix $\mathcal{D}_0 = (\mathcal{D} - \mathcal{H}_A) \pmod{p}$ is also computed.

When the image is needed, any k vectors $v_i$s are combined into an m×k matrix B as $B = [v_1 v_2 \ldots v_k]$. The secret image will be constructed as the secret matrix $\mathcal{D}$ which can be computed as $\mathcal{D} = (\mathcal{H}_0 + \mathcal{H}_B) \pmod{p}$. In this approach, there is nearly lossless in contrast in the reconstructed image, and each image share is m times smaller than the original secret image.

There are at lest two challenges for the image secret sharing using the matrix projection secret sharing:
1) a colored image has three tiers, namely as RGB which composed 2-D red pixels, 2-D green pixels, and 2-D blue pixels, and
2) pixel intensity level is typically between 0-255, which can not be used as prime modulus number p.

The first challenge is easy to address where each share will also have three (3) layers (red, green, and blue intensities) as secret sharing red pixels in red shares, green pixels in green shares, and blue pixels in blue shares.

To address pixel intensity, denote $\Omega$ as the maximum possible pixel intensity level (e.g., 255), then choose 'p' as the largest prime number close to $\Omega$. For example in an 8-bit resolution image, we have $2^8=255$ and $\Omega=233$. However, it will produce two remainder matrices: one for remainder matrix which contains the pixel values larger than p=233, and one for remainder matrix which is $\mathcal{D}_0$ computed from the calculation in the secret sharing using matrix projection.

We can combine these two remainder m×m matrices into a single m×m matrix. Let us first denote the original image matrix as $\mathcal{G}=(g_{ij})$ where $1 \leq i, j \leq m$ and $0 \leq g_{ij} \leq \Omega$, the secret matrix as $\mathcal{D}=(d_{ij})$ where $0 \leq d_{ij} \leq p$, the difference matrix $\mathcal{R}=(r_{ij})=\mathcal{G}-\mathcal{D}$ that:

$$d_{ij} = \begin{cases} g_{ij} & g_{ij} < p \\ g_{ij} - p & g_{ij} \geq p, \end{cases}$$

and $$r_{ij} = \begin{cases} 0 & g_{ij} < p \\ p & g_{ij} \geq p. \end{cases}$$

This ensures that the secret matrix can be used for the modular matrix projection manipulation.

To secret share a matrix $\mathcal{D}$, we have another remainder matrix $\mathcal{D}_0=(o_{ij})$ where $1 \leq i, j \leq m$. Here, we do not want to store two remainder matrices $\mathcal{R}$ and $\mathcal{D}_0$, and we can combine these two matrices into one matrix $\mathcal{Q}=(q_{ij})$ as follows:

$$q_{ij} = \begin{cases} o_{ij} & r_{ij} = 0 \\ EF(p + o_{ij}) & r_{ij} = p; p + o_{ij} \leq \Omega \\ OF(2p + o_{ij} - \Omega) & r_{ij} = p; p + o_{ij} > \Omega \end{cases}$$

where EF is even floor function and OF is odd floor function.

When the image is reconstructed, we can use k vectors $v_i$s to calculate projection matrix $\mathcal{H}_B$. Most importantly, we will need to built two remainder matrices from $\mathcal{Q}=(q_{ij})$ back to two remainder matrices $\mathcal{R}$ and $\mathcal{D}_0$. The remainder matrix $\mathcal{R}=(r_{ij})$ can be constructed as follows, $$r_{ij} = \begin{cases} 0 & q_{ij} < p \\ p & q_{ij} \geq p, \end{cases}$$

and other remainder matrix $\mathcal{D}_0=(o_{ij})$ as follows, $$o_{ij} = \begin{cases} q_{ij} & q_{ij} < p \\ q_{ij} - p & q_{ij} > p; q_{ij} \text{ is even} \\ q_{ij} + \Omega - 2p & q_{ij} > p; q_{ij} \text{ is odd.} \end{cases}$$

The original image $\mathcal{G}$ can be reconstructed as
$\mathcal{G} = (\mathcal{D}_0 + \mathcal{H}_B) \pmod{p} + \mathcal{R}$.

Clearly, this method will ensure that each secret share could not reveal the original image. For a large image, we will use an m×m window and split the whole image into smaller image for image secret sharing. Also, since an image can be partitioned into smaller blocks of matrix, the present invention allow possibilities of real time processing and transmission errors in some image blocks.

Figure 1:
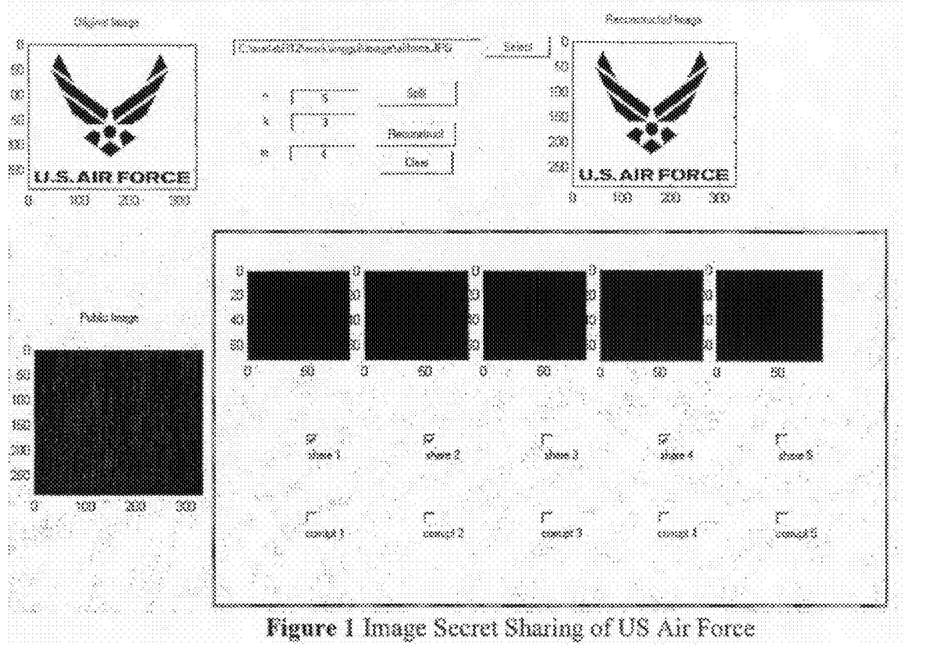
FIG. 1 is a computer screen showing an image secret sharing method according to an exemplary embodiment of the present invention.

We have built simple demonstration software to secret share an "Air Force" image, as shown in FIG. 1.

In FIG. 1, a colored "Air Force" image of 288×322 pixels is split into n=5 shares with the threshold k=3 and a remainder image (i.e., (k, n)=(3, 5) secret sharing). If we choose m=4, each share is 72×84 pixels. In this case, 'm' is equal to the number of pixels processed per iteration. Accordingly, as the value of 'm' increases, overhead is decreased (i.e., each individual share is made smaller), but computations per minute are increased.

The shares are shown in the lower right in FIG. 1. In this example, we have used the shares 1, 2, and 4 to reconstruct the image with the remainder image; in fact any combination of three shares could be used to reconstruct the original image. The top right image is the reconstructed image, which is exactly the same as the original secret image with no distortion or contrast difference. Note also that any one of the 5 shares and remainder image shown in the middle do not reveal any information about the original images.

Figure 2:
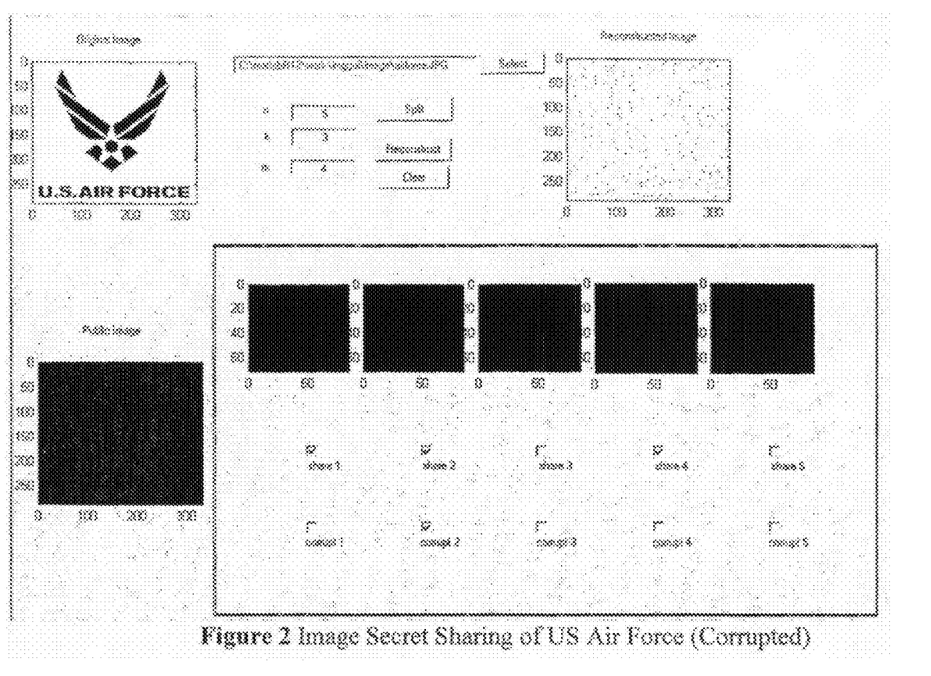
FIG. 2 is a computer screen showing the image secret sharing method of FIG. 1 with a corrupted (or unauthorized) image share.

In FIG. 2, an incorrect share (share 2) will not be able to construct the secret image with shares 1 and 4. As a result, the secret image is protected if k−1 or less image shares are used.

This technique, if implemented in satellite communication networks (satellite transmitter to satellite receiver) or client-multiple server based architectures (e.g., where the shares are stored on multiple servers, but the client does not know which servers, and utilizes a mobile agent to retrieve the shares), can dramatically change transmission security of secret images. The following benefits are easily shown:

1) Security of Image Transmission

An eavesdropper has to break into at least k channels in order to reconstruct the image; this is certainly more secure than sending the image in one channel. Additional security could be added by separate encryption of each channel.

2) Reliability of Image Reconstruction

The data transmission over a communication channel can contain lots of error. The proposed technique provides an error-prone approach to reduce this transmission error. There are a number of combinations that one can construct from the original image. For example, for the above "Air Force" image, one may reconstruct the image using several combinations: (1,2,3), (1,2,4), (1,2,5), (2,3,4), (2,3,5), and (3,4,5), or any combination of four shares at a time.

3) Efficiency of Bandwidth Utilization

Since the image shares are much smaller than the original image, the bandwidth used to transmit these 'n' secret shares does not increase overhead. For the above example, the original image has 92,736 pixels, and each of the shares has 6,048 pixels. The public image (or remainder matrix) has 92,736 pixels which is the same size as the original image. The total transmission of whole process is (92,736+6,048*5)/92,736=1.3261 times of the original image size. The transmission rate is approximately equal to $1+n/m^2=1+5/16=1.3125$. If one needs to use Naor and Shamir's method (and it can be only used for black and white images), the transmission rate for (2, 2) threshold is 4 because there are two image shares and each image share is double size of the original secret image. In addition, this construction makes the image distorted.

4) Other Applications

The proposed matrix projection secret sharing method could also be used for secure transmission of data files, emails, video, etc. Also, client-multiple server architectures (noted above) can adopt this technique to deliver information shares to a destination more reliable and securely, even under a wireless environment.

In sum, the present invention comprises a (k, n) secret sharing scheme using matrix projection, which may be used in (k, n) colored image secret sharing. Any k vector shares lie in the same projection matrix where they can commonly share the same projection matrix. Since the projection matrix is a symmetric matrix, the secret matrix is the sum of the projection matrix and the remainder matrix (which is public information). However, the (public) remainder matrix does not reveal the secret matrix when the projection matrix is unknown.

When the present matrix projection secret sharing (k, n) method is used in satellite transmission to protect information, a satellite transmitter may provide an encrypted information signal (e.g., secret matrix $\mathcal{S}$) on 'n' separate channels to a satellite receiver, and a remainder matrix ($\mathcal{S}_0$) may be made publicly available. In one exemplary embodiment, the satellite receiver would include any 'k' of the 'n' vector shares ($v_i$), and would utilizes such vector shares and the publicly available remainder matrix to derive the secret matrix ($\mathcal{S}$). Alternatively, the satellite receiver may include k−1 vector shares, and the kth vector share may be provided with the encrypted information, such that the combination of vector shares present at the receiver and the remainder matrix will permit generation of the secret matrix ($\mathcal{S}$) at the receiver.

The present matrix projection secret sharing technique can also be used by bank or credit companies to store their valuable information in a secure and reliable manner. This information can thus be efficiently stored in a less compact form.

The present matrix projection secret sharing technique can also be extended into audio, video and audio-visual secret sharing. The music and video industries can use it to protect their property rights and trace the origin of illegal distribution. It can also be used to prevent illegal file sharing systems online. For example, in a music file sharing system, each participant P may be provided a unique set of vector shares ($v_i$), such that each user's projection matrix ($\mathcal{H}_B$) is unique. In this manner, if a user attempts to use a project matrix not assigned to that user to decode music files or other content, the content will not be effectively decoded.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A method for sharing a secret matrix with a plurality of participants comprising the steps of:

generating, by a processor, a projection matrix $H_A$ from a random matrix;

generating, by the processor, a respective vector share from the random matrix for each respective participant;

determining, by the processor, a remainder matrix from the projection matrix and the secret matrix; and distributing the remainder matrix to the plurality of participants and each of the respective vector shares to their respective participants to enable the participants to reproduce the secret matrix using the remainder matrix and a projection matrix $H_B$ generated from a vector share matrix including at least two of the respective vector shares, where $H_A = H_B$.

2. The method of claim 1, wherein
the projection matrix $H_A$ is generated by computing a projection of the random matrix, and computing a modulus of the projection with respect to a prime number;
the respective vector share for each participant is generated by multiplying the projection matrix $H_A$ with a respective random vector for each participant; and
the remainder matrix is determined by computing a difference matrix between the secret matrix and the projection matrix $H_A$, and computing a modulus of the difference matrix with respect to the prime number.

3. The method of claim 2, wherein
the participants reproduce the secret matrix by:
computing a projection of a vector share matrix that includes a combination of at least two respective vector shares,
computing a projection matrix $H_B$ by computing a modulus of the projection matrix with respect to the prime number,
computing a summation matrix between the remainder matrix and the projection matrix $H_B$, and
computing a modulus of the summation matrix with respect to the prime number.

4. A conditional access system comprising:
a participant computer:
 a) receiving a remainder matrix generated by a server based on a projection matrix $H_A$ and a secret matrix, where $H_A$ is generated by the server based on a random matrix,
 b) receiving at least K out of N vector shares, where the N vector shares are generated by the server based on the random matrix, and
 c) reproducing the secret matrix based on a projection matrix $H_B$ and the remainder matrix, where the projection matrix $H_B$ is generated based on a vector share matrix including the at least K out of the N vector shares shares, where N and K are integers K>1, N>K, and $H_A = H_B$.

5. A computer system for sharing a secret matrix with a plurality of participants, the computer system comprising:
at least one server computer; and
at least one user computer coupled to the at least one server through a network,
wherein the at least one server computer includes at least one program stored therein, said program performing the steps of:
 generating a random matrix;
 generating a projection matrix $H_A$ from the random matrix;
 generating a respective vector share from the random matrix for each respective participant;
 determining a remainder matrix from the projection matrix and the secret matrix; and
 distributing the remainder matrix to the plurality of participants and each of the respective vector shares to their respective participants to enable the participants to reproduce the secret matrix using the remainder matrix and a projection matrix $H_B$ generated from a vector share matrix including at least two of the respective vector shares, where $H_A = H_B$.

6. A non-transitory computer readable medium having embodied thereon a computer program for processing by a machine, the computer program for sharing a secret matrix with a plurality of participants, the computer program comprising:
a first code segment for generating a random matrix;
a second code segment for generating a projection matrix $H_A$ from the random matrix;
a third code segment for generating a respective vector share from the random matrix for each respective participant;
a fourth code segment for determining a remainder matrix from the projection matrix and the secret matrix; and
a fifth code segment for distributing the remainder matrix to the plurality of participants and each of the respective vector shares to their respective participants to enable the participants to reproduce the secret matrix using the remainder matrix and a projection matrix $H_B$ generated from a vector share matrix including at least two of the respective vector shares, where $H_A = H_B$.

* * * * *

UNITED STATES PATENT AND TRADEMARK OFFICE
CERTIFICATE OF CORRECTION

PATENT NO. : 8,059,816 B2  
APPLICATION NO. : 11/920339  
DATED : November 15, 2011  
INVENTOR(S) : Li Bai Page 1 of 1

It is certified that error appears in the above-identified patent and that said Letters Patent is hereby corrected as shown below:

On page 13, Column 17, line 22 should read:

"of the projection with respect to the prime num-"

On page 13, Column 17, line 42 should read:

"shares, where N and K are integers K>1, N>K,"

Signed and Sealed this  
Twenty-fourth Day of January, 2012

David J. Kappos  
*Director of the United States Patent and Trademark Office*